United States Patent [19]

Miller

[11] Patent Number: 5,131,162

[45] Date of Patent: Jul. 21, 1992

[54] DEVICE FOR IDENTIFYING THE SIZE OF BOLTS AND NUTS

[76] Inventor: Howard F. Miller, 14 S. Park Ave., Bayshore, N.Y. 11706

[21] Appl. No.: 651,638

[22] Filed: Feb. 6, 1991

[51] Int. Cl.$^5$ .............................................. G01B 3/36
[52] U.S. Cl. ................... 33/562; 33/199 R; 33/555.2
[58] Field of Search ............ 33/501.45, 562, 563, 33/565, 564, 501.05, 501.08, 199 R, 548, 199 B, 555.2

[56] References Cited

U.S. PATENT DOCUMENTS

| | | | |
|---|---|---|---|
| 1,881,651 | 10/1932 | Judge | 33/562 |
| 1,950,469 | 3/1934 | Barwood | 33/562 |
| 2,579,857 | 12/1951 | Premo | 33/565 |
| 2,604,702 | 7/1952 | Collins | 33/565 |
| 3,238,629 | 3/1966 | Hurwitz | 33/562 |
| 4,138,820 | 2/1979 | O'Conner | 33/562 |
| 4,170,069 | 10/1979 | Katsanevas | 33/555.2 |

Primary Examiner—William A. Cuchlinski, Jr.
Assistant Examiner—William C. Dowling
Attorney, Agent, or Firm—Richard L. Miller

[57] ABSTRACT

A device for identifying the size of bolts and nuts is provided and consists of a plate. A first mechanism on the plate, is for measuring different sized threaded shanks of unidentified loose bolts. A second mechanism on the plate, is for measuring different sized unidentified loose nuts. A third mechanism removable from the plate, is for measuring different sized unidentified threaded studs mounted on massive objects. A fourth mechanism removable from the plate, is for measuring different sized unidentified threaded apertures in massive objects. Indicia is disposed on the plate for indicating the sizes of the bolts and nuts.

2 Claims, 1 Drawing Sheet

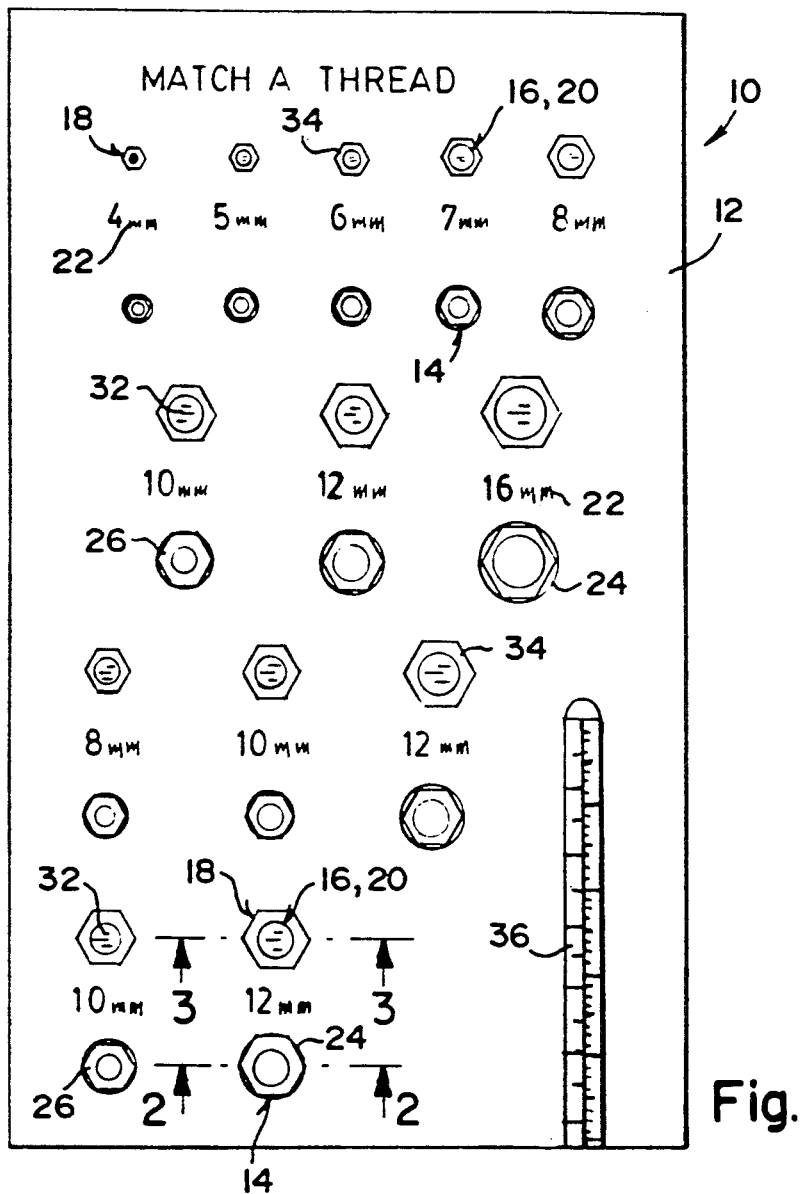
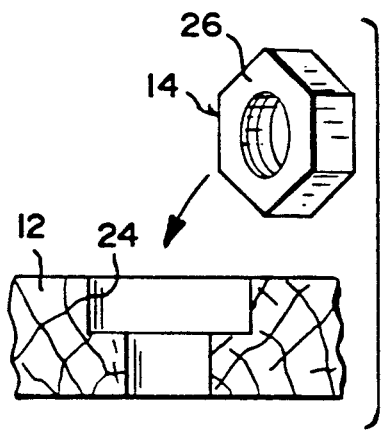
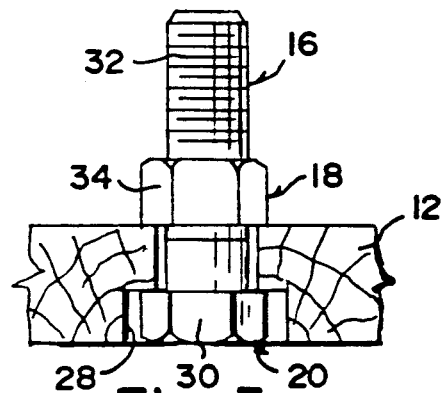

DEVICE FOR IDENTIFYING THE SIZE OF BOLTS AND NUTS

BACKGROUND OF THE INVENTION

The instant invention relates generally to measuring tools and more specifically it relates to a device for identifying the thread size of bolts, nuts, threaded apertures and threaded rods.

Numerous measuring tools have been provided in the prior art that are adapted to be gauges for indicating various sizes of different items. For example, U.S. Pats. numbered 4,177,570 to Hewitt; 4,545,126 to Nielson et al. and 4,677,751 to Masseth all are illustrative of such prior art. While these units may be suitable for the particular purpose to which they address, they would not be as suitable for the purpose of the present invention as hereafter described.

SUMMARY OF THE INVENTION

A primary object of the present invention is to provide a device for identifying the thread size of bolts nuts, threaded apertures, and threaded rods that will overcome the shortcomings of the prior art devices.

Another object is to provide an instant invention for identifying the size of bolts and nuts in which various sized nuts and bolts are affixed to the instant invention so that loose unidentified nuts and bolts can be measured by testing their fit on the nuts and bolts on the instant invention.

An additional object is to provide an instant invention for identifying the size of bolts and nuts in which the various sized nuts and bolts on the instant invention can be removed so that unidentified threaded apertures and threaded rods which are effectively mounted on massive objects because they are an integral part of such object can be measured by testing their fit with removed nuts and bolts from the instant invention.

A further object is to provide a device for identifying the size of bolts and nuts that is simple and easy to use.

A still further object is to provide a device for identifying the size of bolts and nuts that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is an elevational plan view of the instant invention;

FIG. 2 is a diagrammatic cross sectional view with the nut in perspective taken along 2—2 of FIG. 1; and FIG. 3 is a diagrammatic cross sectional view taken along line 3—3 in FIG. 1.

DETAILED DESCRIPTION OF THE PREFERRED EMBODIMENTS

Turning now descriptively to the drawings, in which like reference characters denote like elements throughout the several views, the Figures illustrate a device 10 for identifying the size of bolts and nuts which consists of a generally rectangular plate 12. A first mechanism 14 on the plate 12 is for measuring different sized threaded shanks of unidentified loose bolts. A second mechanism 16 on the plate 12 is for measuring different sized unidentified loose nuts. A third mechanism 18, removable from plate 12, is for measuring different sized unidentified threaded studs mounted on massive objects. A fourth mechanism 20, removable from the plate 12, is for measuring different size unidentified threaded apertures in massive objects. Indicia 22 is disposed on the plate 12 is for indicating the sizes of the bolts and nuts.

The first measuring mechanism 14 includes the rectangular plate 12 having a plurality of spaced apart top surfaced counterbore apertures 24 being progressively individually larger. A plurality of nuts 26 are provided, with each being progressively larger so as to be forced fitted into one respective top counterbore aperture 24. The nuts 26 can measure the different sized threaded shanks of the unidentified loose bolts by testing the fit therein.

The second measuring mechanism 16 includes the rectangular plate 12 having a plurality of spaced apart bottom surfaced counterbore apertures 28 being progressively individually larger. A plurality of bolts 30 are provided, with each having a threaded shank 32 and being progressively individually larger so as to fit into one respective bottom counterbore aperture 28. A plurality of nuts 34 are provided with each being progressively individually larger so as to thread and be stored onto one respective matching threaded shank 32 of one bolt 30, so that the threaded shanks 32 can measure the different sized unidentified loose nuts by testing the fit thereon.

The third measuring mechanism 18 includes the stored nuts 34 removed from the threaded shanks 32 of the bolts 30 so that the removed nuts 34 can now be used to measure the different size unidentified mounted threaded studs on the massive objects by testing the fit thereon.

The fourth measuring mechanism 20 includes the bolts 30 removed from the bottom counterbore aperture 28 in the plate 12 so that said removed bolts 30 can now be used to measure the different sized unidentified threaded apertures in the massive objects by testing the fit therein.

The instant invention 10 further includes a scale 36 disposed on the plate 12 for measuring the varying lengths of the threaded shanks of the unidentified loose bolts and the threaded studs mounted on the massive objects to help identify the same.

The plate 12 can be made out of any suitable material, such as wood, soft metal, plastic and the like. The bolts 30, nuts 26 and 34 and the scale 36 can be made out of any suitable durable metal, such as iron, brass and the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A device for identifying the size of bolts and nuts which comprises:

a) a plate;

b) first means on said plate, for measuring different sized threaded shanks of unidentified loose bolts, including a plurality of spaced apart, top surfaced, counterbores formed in said plate and being progressively individually larger; and a plurality of nuts, each being progressively individually larger so as to be forced fitted into one respective top counterbore aperture, so that said nuts can be meshed with and thereby measure the different sized threaded shanks of the unidentified loose bolts;

c) second means on said plate, for measuring different sized unidentified loose nuts, including a plurality of spaced apart, bottom surfaced, counterbores in said plate and being progressively individually larger; a plurality of bolts, each having a threaded shank and begin progressively individually larger so as to be fit into one respective bottom counterbore aperture; and, a plurality of nuts, each being progressively individually larger so as to thread and be stored onto one respective matching thread shank of one said bolt, so that the threaded shanks can be meshed with and thereby measure the different size, unidentified loose nuts;

d) third means removable from said plate, for measuring different sized unidentified threaded studs mounted on massive objects, including said stored nuts removed from the threaded shanks of said bolts so that said removed nuts can be used to mesh with and thereby measure the different sized unidentified mounted threaded studs on the massive objects, e) fourth means removable from said plate, for measuring different sized unidentified apertures in massive objects, including said bolts removed from the bottom counterbore apertures in said plate so that said removed bolts can be used to mesh with and thereby measure the different sized unidentified threaded apertures in the massive objects, f) indicia disposed on said plate for indicating the sizes of the bolts and nuts thus measured.

2. A device for identifying the size of bolts and nuts as recited in claim 1, further including a scale disposed on said plate for measuring the varying lengths of the threaded shanks of unidentified loose bolts and the threaded studs mounted on the massive objects to help identify the same.

* * * * *